J. D. FLORY.
TRACTOR.
APPLICATION FILED DEC. 8, 1916.

1,238,752.

Patented Sept. 4, 1917.
5 SHEETS—SHEET 1.

Witnesses
H. H. Lybrand
Wm. Bagger

Inventor
J. D. Flory
By Victor J. Evans
Attorney

J. D. FLORY.
TRACTOR.
APPLICATION FILED DEC. 8, 1916.

1,238,752.

Patented Sept. 4, 1917.
5 SHEETS—SHEET 3.

Inventor
J. D. Flory
Witnesses
By Victor J. Evans Attorney

J. D. FLORY.
TRACTOR.
APPLICATION FILED DEC. 8, 1916.

1,238,752.

Patented Sept. 4, 1917.
5 SHEETS—SHEET 5.

WITNESSES

INVENTOR
J. D. Flory
BY Victor J. Evans
ATTORNEY

UNITED STATES PATENT OFFICE.

JESSE D. FLORY, OF CAMDEN, OHIO.

TRACTOR.

1,238,752.  Specification of Letters Patent.  Patented Sept. 4, 1917.

Application filed December 8, 1916. Serial No. 135,844.

*To all whom it may concern:*

Be it known that I, JESSE D. FLORY, a citizen of the United States, residing at Camden, in the county of Preble and State of Ohio, have invented new and useful Improvements in Tractors, of which the following is a specification.

This invention relates to tractors and motor vehicles, and it has particular reference to automatic leveling devices for the same.

The invention has for its object to produce simple and improved means whereby the ground wheels at the two sides of the tractor or motor vehicle may be automatically adjusted by raising one and lowering the other so as to preserve the vehicle frame or engine frame in a level position when traveling on a slanting road or on a hillside.

A further object of the invention is to produce simple and effective means whereby two wheels at opposite sides of a motor or tractor frame may be simultaneously adjusted, one upwardly and the other downwardly, to maintain the frame structure in a substantially level condition, the said means including a constantly driven worm shaft, opposite worm gears adapted to mesh therewith, and a pendulum by the gravitational action of which the constantly driven worm shaft will be placed in engagement with one or the other of said worm gears when a hillside is encountered, thereby maintaining the tractor frame in a substantially level condition.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Corresponding parts in the several figures are denoted by like characters of reference.

The tractor frame 15 supports a counter shaft 16 which is adapted to receive motion by any convenient form of transmission from the motor, conventionally indicated at M. Pivotally mounted for rotation about the axis of the counter shaft 16 are crank arms 17, each of which has a segmental face provided with a guide rib 18 engaging an arcuate guide 19 on the tractor frame, and whereby the crank arm is reinforced and the motion thereof steadied. Each crank arm carries a spindle 20 on which a ground wheel 21 is mounted for rotation, said ground wheel having been shown as being equipped with a spur wheel 22 mounted on the spokes thereof and meshing with a pinion 23 on the counter shaft 16, whereby the ground wheel is driven, it being obvious that the ground wheel being supported for movement in an arc concentric with the axis of the counter shaft, transmission of motion from the counter shaft to the ground wheel will take place in any position to which the ground wheel may be adjusted relatively to the tractor frame.

24 designates a segment rack which is supported for rocking movement about an axis 25 with which the segment rack is concentric. The segment rack is provided with terminal arms 26 which are connected by links 27 with the crank arms 17 at the two sides of the tractor frame, the said links being connected with the crank arms by means of knuckles 28 that enable the links to adapt themselves to the respective movements of the rocking segment and the crank arms, said movements being in planes substantially at right angles to each other. Similar knuckles may be used for connecting the links 27 with the arms 26 of the rocking segment. It will be obvious that by the rocking movement of the segment 24 the ground wheels at the two sides of the tractor will be moved oppositely with respect to the tractor frame, one being moved upwardly, while the other is moved downwardly, thus enabling said ground wheels to be adapted for travel on a side hill without disturbing the level of the tractor frame.

Figure 1:
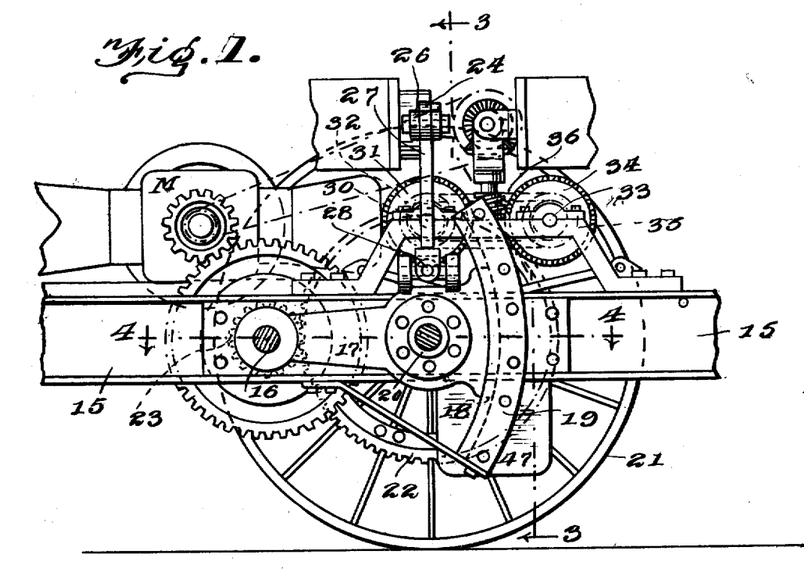
Figure 1 is a view in side elevation of a portion of a tractor frame to which the invention has been applied.
Figure 2:
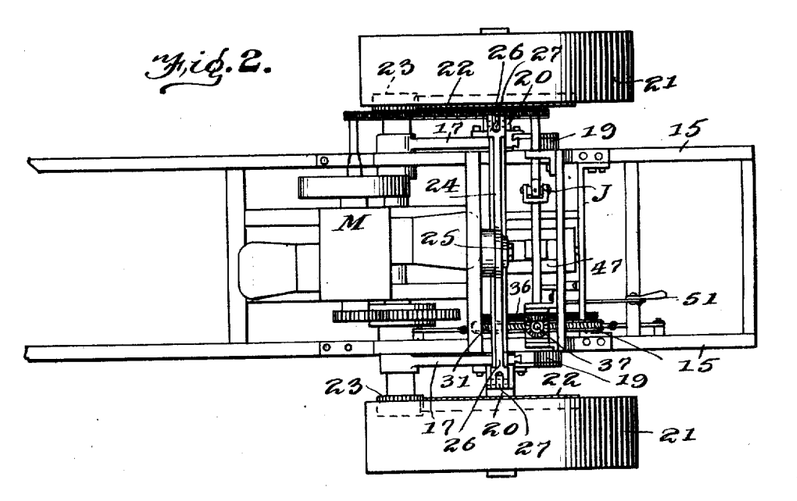
Fig. 2 is a top plan view of the same.
Figure 3:
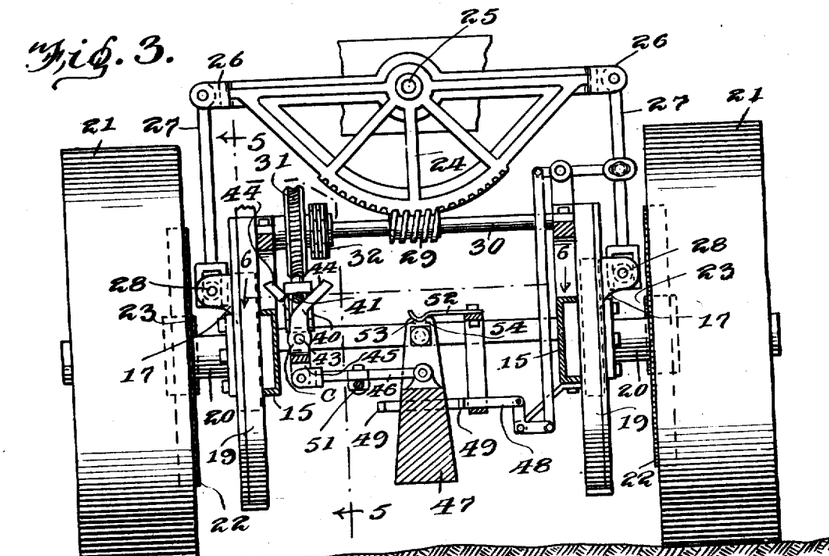
Fig. 3 is a transverse sectional view taken on the line 3—3 in Fig. 1.
Figure 4:
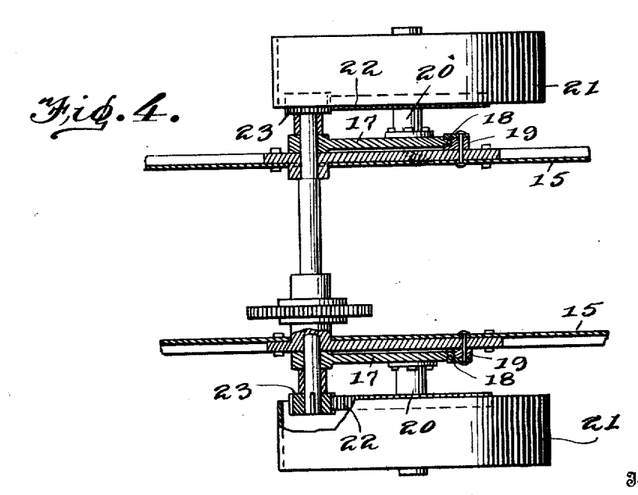
Fig. 4 is a horizontal sectional view taken on the line 4—4 in Fig. 1.
Figures 5, 6:
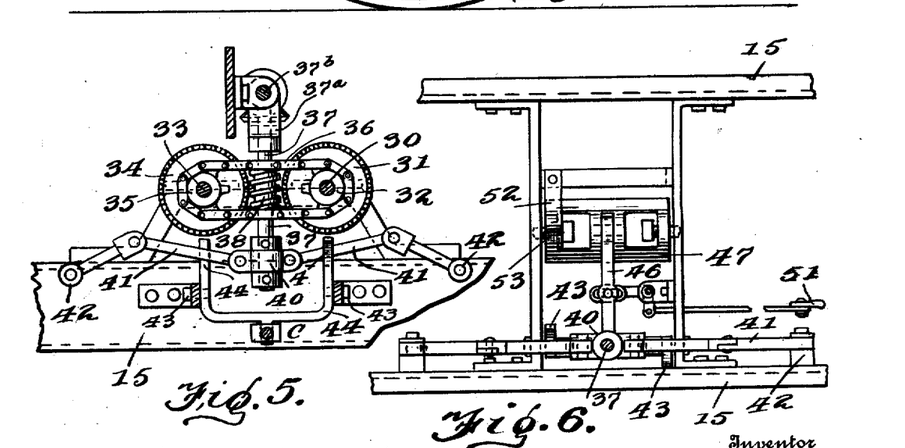
Fig. 5 is a sectional view taken on the line 5—5 in Fig. 3.
Fig. 6 is a sectional view taken on the line 6—6 in Fig. 3.
Figure 7:
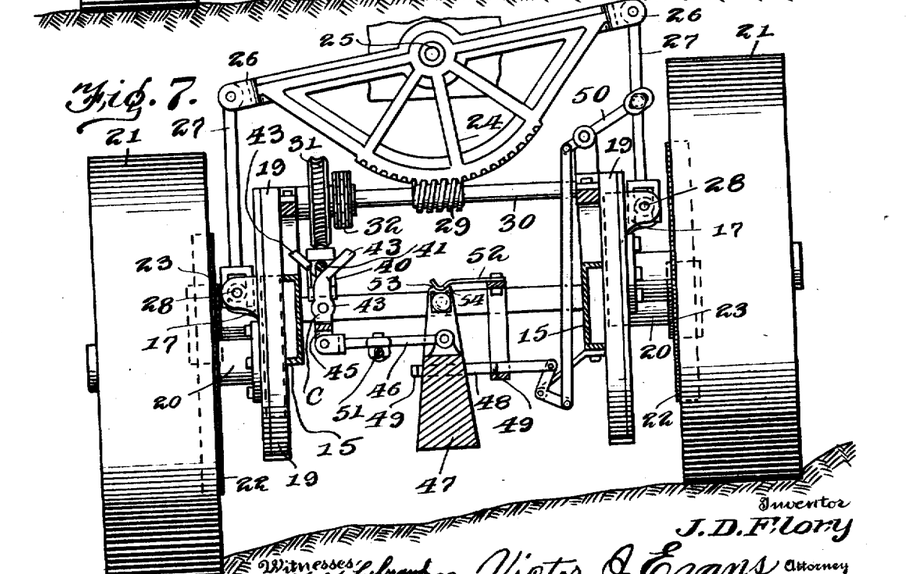
Fig. 7 is a view taken on the same plane as Fig. 3, but showing the parts in a different position.

The segment rack 24 meshes with and is actuated by a worm 29 on a shaft 30 which is mounted for rotation adjacent to the rack, said shaft carrying a worm gear 31 and a sprocket wheel 32. A counter shaft 33 supported in spaced relation and parallel to the shaft 30 carries a worm gear 34 and a sprocket wheel 35, said worm gear and sprocket wheel being disposed in the respective planes of the worm gear 31 and the sprocket wheel 32 previously described, and a chain 36 being trained over the sprocket wheels 32, 35 whereby, when one of the worm gears is driven, motion will be transmitted to its mate through the sprocket wheels and chain, (see Fig. 5).

A shaft 37 having a worm 38 is supported for rocking movement by a bearing member 37ᵃ pivoted at 37ᵇ intermediate the worm gears 31, 34, the position of the worm shaft being normally neutral between the worm gears, but so contrived that by a slight rocking movement of the shaft the worm thereon may be placed in mesh with one or the other of the worm gears. The shaft 37 is constantly driven by a suitable transmission from the motor M when the machine is in operation, a universal joint J being included in the transmission to enable the shaft to have the necessary freedom of rocking movement. It is also obvious that the bearings for the shaft 37 are to be so contrived as to permit such rocking movement to take place. The extent of said rocking movement need only be sufficient to enable the shaft to assume a neutral position between the worm gears or to mesh with either one of said gears. It will be readily understood that when the worm gear 31 is engaged and driven by the worm shaft, motion will be transmitted directly to the worm carrying shaft 29 whereby the segment 24 is rocked; should the worm gear 34 be engaged by the worm shaft 37, motion will be transmitted in a reverse direction to that imparted by the worm carrying shaft 29 through the transmission means including the sprocket wheels 32, 35 and the chain 36.

The free end of the worm shaft 37 is provided with a cuff 40 which is connected by oppositely disposed toggles 41 with fixed points such as brackets 42 on the machine frame, the toggles being so arranged that by proper movement thereof the end of the shaft engaging the cuff will be rocked to place the worm 38 in mesh with one or the other of the worm gears. This movement may be accomplished by means of a yoke C pivotally supported on trunnions 43 and having oppositely beveled arms or limbs 44 that wipe the toggles 41 so that by rocking movement of the yoke the toggles will be actuated to impart rocking movement to the worm shaft 37. The yoke C has a third arm 45 which is connected by a suitable transmission including a connecting rod 46 with a pendulum 47 which is suspended for swinging movement in a convenient position intermediate the side members of the engine frame, preferably midway between said side members, said pendulum being arranged for swinging movement transversely of the frame.

It is obvious that when a side hill is encountered by the tractor, the tractor frame will be tilted. When this occurs the pendulum, the tendency of which is to gravitationally maintain a vertical position, will through the intermediate connections actuate the toggles 41, thereby swinging the worm shaft 27 into mesh with one or the other of the worm gears 31 and 34, according to the direction in which the tractor frame is tilted. The worm gear meshing with the worm shaft 37 will be rotated thereby, transmitting motion to the worm shaft 30, thereby actuating the rocking segment 24, actuating the crank arms carrying the ground wheels, thereby moving the ground wheel at the low side of the tractor frame downward and the ground wheel at the high side of the tractor frame upward, until the level condition of the tractor frame is restored, when, by the gravitational action of the pendulum, the worm shaft 37 will be thrown out of mesh and restored to a neutral position.

To prevent undue strain upon and injury to the parts of the device, I employ a safety device consisting of a rod 48 extending transversely through the pendulum and having stops 49 adapted for engagement with opposite sides of said pendulum. The safety rod 48 is connected by means including a bell crank 50 with one of the links 27, whereby the crank arm 17 at one side of the frame is connected with the rocking segment 24. The parts are so arranged and proportioned that when the crank arm actuated by the link with which the safety rod is connected approaches the limit of its movement in one direction or the other, one of the stop members 49 will engage the pendulum and restore it to its normal or initial position with respect to the tractor frame when the latter is in a level condition, thereby restoring the worm shaft 37 to a neutral position and interrupting further movement of the parts. When the slant of the hillside decreases the pendulum will again gravitate in the proper direction to set the parts in motion so as to restore the parts to their initial position when the tractor frame assumes a level position.

It may at times be desirable to tilt the tractor frame to one side or the other for the purpose of avoiding obstacles in the path of the frame of the machine, such as the limbs of trees and the like. When this is desired the pendulum may be actuated to swing it in either direction by means of a hand lever 51 having suitable connection with the connecting rod 46, and thereby with the pendulum. For the purpose of preventing undue swinging movement of the pendulum when the machine is traveling over rough roads, a spring latch 52 is provided, the same having a beveled projection 53 engaging a recess 54 in the top of the pendulum, the spring latch being so tensioned that while it will be sufficient to restrain the pendulum from undue swinging movement, it will not interfere with the legitimate swinging movement of said pendulum when a side hill is encountered.

Figure 8:
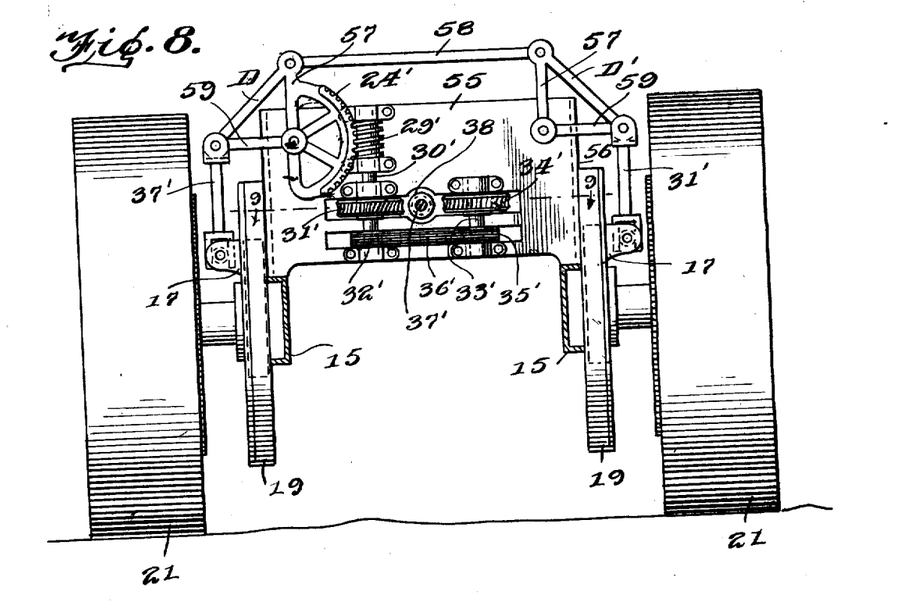
Fig. 8 is a view partly in elevation and partly in transverse section through the tractor frame illustrating a modified form of the invention.
Figure 9:
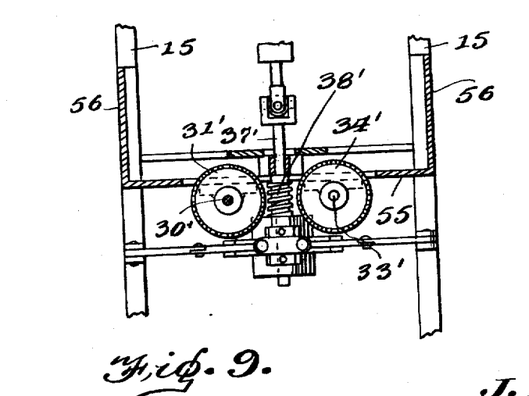
Fig. 9 is a sectional view taken on the line 9—9 in Fig. 8.

In Figs. 8 and 9 there has been illustrated a slightly modified form of the invention under which the worm shaft 37 and the worm gears and sprocket wheels coöperating therewith, instead of being disposed in a substantially vertical plane, as in the preceding figures, have been shown as being mounted in a substantially horizontal plane. In this modified form a supporting plate 55 is provided, the same having flanges 56 which are bolted or otherwise secured on the side members of the tractor frame 15. Adjacent to the top corners of the supporting plate 55 are fulcrumed bell cranks D, D', one of which, D, has a rack segment 24' connected therewith, said rack segment meshing with a worm 29' on a vertically disposed shaft 30'. Each of the bell cranks D and D' has an upwardly extending arm 57, said arms being connected together by a link rod 58 whereby the bell cranks will be actuated in unison. Each bell crank also has a laterally extending arm 59 with which the upper end of a link 37' is connected, the lower end of said link being connected in the manner previously described with one of the crank arms 17. The vertically disposed shaft 30' carries a worm gear 31' and a sprocket wheel 32'. A counter shaft 33' carries a worm gear 34' and a sprocket wheel 35', a chain 36' being trained over the sprocket wheels 32' and 35'. The worm gears 31', 34' and the sprocket wheels 32', 35' are horizontally disposed, and supported for rocking movement between the worm gears is a constantly driven shaft 37' carrying a worm 38' which normally occupies a neutral position, but which by rocking movement of the shaft 37' may be placed in mesh with either one of the worm gears. The rock shaft 37' is actuated by means of a pendulum and intermediate connections in precisely the same manner and with the same results as the worm carrying shaft 37 which has been previously described in connection with Figs. 1 to 7, inclusive.

In the foregoing description, reference has been made to only one ground wheel at each side of the tractor frame, and it may here be stated that the invention is thoroughly well adapted to two wheeled tractors, means of this type being frequently employed for the purpose of operating agricultural machines of various kinds, such as cultivators and the like, where it is essential that the machine shall be capable of making short turns at the end of a row of plants. A machine of this type equipped with my invention will be found particularly useful for operating in fields that are located on side hills. It is to be understood, however, that no limitation is made in the application of the present invention to two wheeled tractors, since it is obvious that by equipping a four wheeled tractor with cranks to carry each of the ground wheels, and by making suitable connections between the front and rear cranks, the present invention may be equally well applied to a tractor having four or more wheels. It is not deemed necessary, however, to particularly describe or illustrate such application, since nothing would be involved therein or in the construction thereof beyond the skill of an ordinary mechanic to produce.

Figure 10:
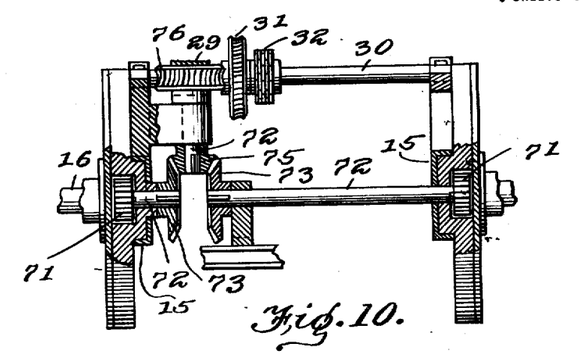
Fig. 10 is a transverse sectional detail view of the machine illustrating a further modified construction of the mechanism for actuating the wheel carrying arms of the tractor.
Figures 11, 12:
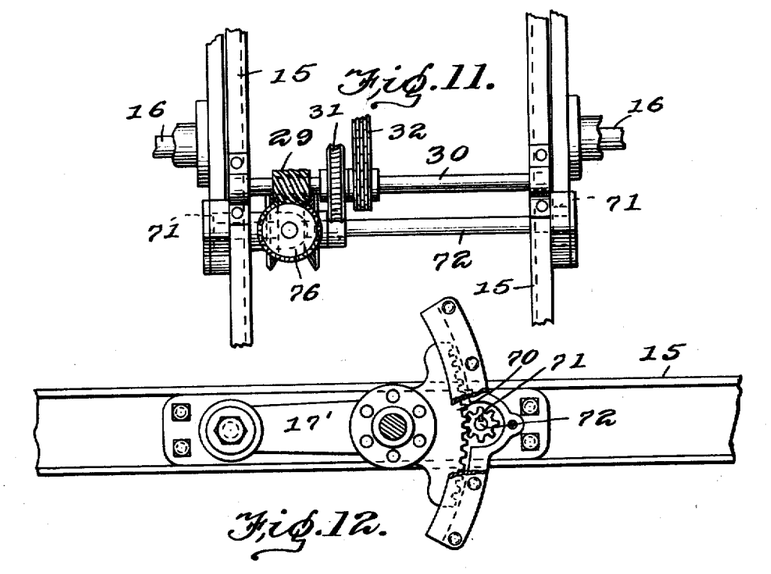
Fig. 11 is a plan view of the parts illustrated in Fig. 10.
Fig. 12 is a detail side view of one of the wheel carrying crank arms and related parts.

A further modification of the invention, which is illustrated in Figs. 10, 11 and 12, has for its object to simplify the means for transmission of motion from the worm carrying shaft 30 to the wheel carrying cranks or arms. By this modification, said arms, which are here designated by 17', are provided at their free arcuate ends with teeth 70. Said teeth mesh with pinions 71 carried by shafts 72 which are mounted in the frame in longitudinal axial alinement, each of said shafts carrying at its inner end a bevel gear 73. A shaft 74 which is supported for rotation in a plane at right angles to the shafts 72 carries a bevel pinion 75 meshing with the two bevel gears 73, and the shaft 74 also carries a worm gear 76 meshing with the worm 29 of the shaft 30, said shaft 30 being mounted and actuated in a manner precisely similar to that previously shown and described in connection with Figs. 1 to 9, inclusive, of the drawings. This mode of transmission, while more simple, less expensive, and occupying less room than the forms of transmission heretofore shown and described, will be found to be thoroughly useful and practicable under many conditions.

The improved device herein described is simple in construction, capable of being readily applied to and installed upon tractors of various kinds and type, and by the use thereof the objectionable tilting of the tractor frame on a hillside or on a slanting road will be entirely avoided, thus also avoiding the danger of skidding or upsetting. The principle of the invention is equally applicable to motor vehicles of various kinds.

Having thus described the invention, what is claimed as new, is:—

1. A tractor frame, ground wheel carrying cranks at opposite sides thereof, motor driven means for actuating the cranks at the two sides of the tractor frame simultaneously in opposite directions, and means including a pendulum for governing the motion and the direction of movement of said actuating means.

2. A tractor frame, ground wheels at opposite sides of said frame, means for supporting the ground wheels for vertical movement relatively to the frame, motor driven means for simultaneously moving the ground wheels at the two sides of the frame vertically in opposite directions, and means including a pendulum for governing the motion and the direction of movement of said motor driven means.

3. A tractor frame, ground wheels at the two sides thereof supported for vertical movement relatively to the frame, motor driven means including a segment rack and a worm meshing therewith to effect vertical adjustment of the ground wheels and to secure the same in adjusted position relatively to the frame, and means including a pendulum for governing the motion and the direction of movement of the worm shaft meshing with the segment rack.

4. A tractor frame, ground wheel carrying cranks supported pivotally at opposite sides thereof, a rack segment supported for rocking movement of the frame and having laterally extending arms, link rods and knuckles connecting said arms with the wheel carrying cranks, a shaft having a worm meshing with the rack segment, a counter shaft supported in parallel relation thereto, mating worm gears and sprocket wheels on the worm carrying shaft and the counter shaft, a chain trained over the sprocket wheels, a swingingly supported constantly driven worm shaft intermediate the gear wheels, and means for swinging the last mentioned worm shaft in engagement with either one of the worm gears.

5. A tractor frame, ground wheel carrying cranks supported pivotally at opposite sides thereof, a rack segment supported for rocking movement of the frame and having laterally extending arms, link rods and knuckles connecting said arms with the wheel carrying cranks, a shaft having a worm meshing with the rack segment, a counter shaft supported in parallel relation thereto, mating worm gears and sprocket wheels on the worm carrying shaft and the counter shaft, a chain trained over the sprocket wheels, a swingingly supported constantly driven worm shaft intermediate the gear wheels, and means for swinging the last mentioned worm shaft in engagement with either one of the worm gears, said means including a pendulum supported for swinging movement transversely with respect to the tractor frame, and suitable connections.

6. A tractor frame, cranks supported pivotally at the two sides thereof, ground wheels carried by said cranks, means for simultaneously actuating the ground wheel carrying cranks in opposite directions, said means including a rockingly supported rack segment and suitable connections, a shaft having a worm meshing with the rack segment, means for driving the worm carrying shaft for reverse rotation thereof, said means including two worm gears, means for transmitting motion between said worm gears and a motor driven worm shaft swingingly supported between the two worm gears, and means including a transversely swinging pendulum for swinging the worm shaft from neutral position into mesh with one of the worm gears, and vice versa.

7. A tractor frame, a motor driven counter shaft thereon, cranks supported at the two sides of the tractor frame for rotation about the axis of the counter shaft, ground wheels carried by said cranks, intermeshing gear wheels on the counter shaft and on the ground wheels, and means for swinging the cranks in opposite directions to effect vertical adjustment of the ground wheels relatively to the tractor frame, said means including a pair of worm gears, a constantly driven worm shaft swingingly supported therebetween, and means for moving said worm shaft from neutral into mesh with one of the worm gears.

8. A tractor frame, a motor driven counter shaft thereon, cranks supported at the two sides of the tractor frame for rotation about the axis of the counter shaft, ground wheels carried by said cranks, intermeshing gear wheels on the counter shaft and on the ground wheels, and means for swinging the cranks in opposite directions to effect vertical adjustment of the ground wheels relatively to the tractor frame, said means including a pair of worm gears, a constantly driven worm shaft swingingly supported therebetween, and a transversely swinging pendulum and connecting means for moving the worm shaft from neutral into mesh with one of the worm gears.

9. A tractor having ground wheels supported for vertical movement with respect to the tractor frame, motor driven means for effecting adjustment simultaneously in opposite directions of the ground wheels at the two sides of the tractor frame, and means for starting and stopping and for governing the direction of rotation of the motor driven means.

10. A tractor having ground wheels supported for vertical movement with respect to the tractor frame, motor driven means for effecting adjustment simultaneously in opposite directions of the ground wheels at the two sides of the tractor frame, and means for starting and stopping and for governing the direction of rotation of the motor driven means, said means including a pendulum supported for transverse swinging movement and whereby the starting, stopping and direction of rotation of the motor driven means are automatically governed.

11. A tractor having ground wheels supported for vertical movement with respect to the tractor frame, motor driven means for effecting adjustment simultaneously in opposite directions of the ground wheels at the two sides of the tractor frame, and means for starting and stopping and for governing the direction of rotation of the motor driven means, said means including a pendulum supported for transverse swinging movement and whereby the starting, stopping and direction of rotation of the motor driven means are automatically governed; in combination with a safety device whereby the pendulum will be automatically moved in the direction of its initial position when the movement of the wheel adjusting means exceeds a predetermined limit.

12. A tractor having ground wheels supported for vertical movement with respect to the tractor frame, motor driven means for effecting adjustment simultaneously in opposite directions of the ground wheels at the two sides of the tractor frame, and means for starting and stopping and for governing the direction of rotation of the motor driven means, said means including a pendulum supported for transverse swinging movement and whereby the starting, stopping and direction of rotation of the motor driven means are automatically governed; in combination with a safety rod extending through the pendulum and having stops at opposite sides thereof, and a connection between the safety rod and the wheel adjusting means, whereby the pendulum will be moved in the direction of its initial position when the movement of said adjusting means exceeds a predetermined limit.

13. A tractor having ground wheels supported for vertical movement with respect to the tractor frame, motor driven means for effecting adjustment simultaneously in opposite directions of the ground wheels at the two sides of the tractor frame, and means for starting and stopping and for governing the direction of rotation of the motor driven means, said means including a pendulum supported for transverse swinging movement and whereby the starting, stopping and direction of rotation of the motor driven means are automatically governed; in combination with a spring latch engaging the pendulum to restrain swinging movement thereof.

14. A tractor having ground wheels supported for vertical movement with respect to the tractor frame, motor driven means for effecting adjustment simultaneously in opposite directions of the ground wheels at the two sides of the tractor frame, and means for starting and stopping and for governing the direction of rotation of the motor driven means, said means including a pendulum supported for transverse swinging movement and whereby the starting, stopping and direction of rotation of the motor driven means are automatically governed; in combination with a spring latch engaging the pendulum to restrain swinging movement thereof, said pendulum having a recess therein, and said spring latch having a beveled projection engaging said recess.

15. A tractor frame, ground wheels at the two sides thereof supported for vertical movement relatively to the frame, motor driven means including a segment rack and a worm meshing therewith to effect vertical adjustment of the ground wheels and to secure the same in adjusted position relatively to the frame, means including a pendulum for governing the motion in the direction of movement of the worm shaft meshing with the segment rack, and means whereby the pendulum may be positively actuated independently of the gravitational movement thereof.

16. A tractor frame, ground wheels at the two sides thereof supported for vertical movement relatively to the frame, motor driven means including a segment rack and a worm meshing therewith to effect vertical adjustment of the ground wheels and to secure the same in adjusted position relatively to the frame, means including a pendulum for governing the motion and the direction of movement of the worm shaft meshing with the segment rack, and a hand lever and suitable connections whereby the pendulum may be positively actuated independently of the gravitational movement thereof.

17. A tractor frame, ground wheel carrying members at opposite sides thereof, motor driven means for actuating the wheel carrying members at the two sides of the tractor frame in opposite directions, and means including a pendulum for governing the motion and the direction of movement of said actuating means.

18. A tractor frame, ground wheel carrying members at opposite sides thereof, motor driven means for actuating the wheel carrying members at the two sides of the tractor frame simultaneously in opposite directions, means including a pendulum for governing the motion and the direction of movement of said actuating means, and means whereby the pendulum may be positively actuated independently of the gravitational movement thereof.

19. A tractor frame, ground wheel carrying members at opposite sides thereof, motor driven means for actuating the wheel carrying members at the two sides of the tractor frame simultaneously in opposite directions, means including a pendulum for governing the motion and the direction of movement of said actuating means, and means whereby the pendulum may be positively actuated independently of the gravitational movement thereof, said means including a hand lever and suitable connections.

In testimony whereof I affix my signature.

JESSE D. FLORY.

Copies of this patent may be obtained for five cents each, by addressing the "Commissioner of Patents, Washington, D. C."